US011749280B2

(12) United States Patent
Burakov et al.

(10) Patent No.: US 11,749,280 B2
(45) Date of Patent: Sep. 5, 2023

(54) DYNAMICALLY DELAYING EXECUTION OF AUTOMATED ASSISTANT ACTIONS AND/OR BACKGROUND APPLICATION REQUESTS

(71) Applicant: GOOGLE LLC, Mountain View, CA (US)

(72) Inventors: Denis Burakov, Zurich (CH); Sergey Nazarov, Zurich (CH); Behshad Behzadi, Freienbach (CH); Mario Bertschler, Zurich (CH); Bohdan Vlasyuk, Zurich (CH); Daniel Cotting, Islisberg (CH); Michael Golikov, Merlischachen (CH); Lucas Mirelmann, Zurich (CH); Steve Cheng, Los Altos, CA (US); Zaheed Sabur, Baar (CH); Okan Kolak, Sunnyvale, CA (US); Yan Zhong, Sunnyvale, CA (US); Vinh Quoc Ly, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/086,263

(22) Filed: Dec. 21, 2022

(65) Prior Publication Data
US 2023/0125662 A1    Apr. 27, 2023

Related U.S. Application Data

(63) Continuation of application No. 17/045,273, filed as application No. PCT/US2019/035563 on Jun. 5, 2019, now Pat. No. 11,545,151.
(Continued)

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/223* (2013.01); *G10L 2015/227* (2013.01)

(58) Field of Classification Search
CPC ................................ G10L 15/22; G06F 3/167
See application file for complete search history.

(56) References Cited

U.S. PATENT DOCUMENTS 6,415,304 B1    7/2002  Horvitz
2007/0180028 A1    8/2007  Chen et al.
(Continued)

OTHER PUBLICATIONS

European Patent Office; Communication pursuant to Article 94(3) issued in Application No. 19731123.6, 6 pages, dated Feb. 25, 2022.
(Continued)

*Primary Examiner* — Ibrahim Siddo
(74) *Attorney, Agent, or Firm* — Gray Ice Higdon

(57) ABSTRACT

Implementations set forth herein allow a user to access a first application in a foreground of a graphical interface, and simultaneously employ an automated assistant to respond to notifications arising from a second application. The user can provide an input, such as a spoken utterance, while viewing the first application in the foreground in order to respond to notifications from the second application without performing certain intervening steps that can arise under certain circumstances. Such intervening steps can include providing a user confirmation, which can be bypassed, and/or time-limited according to a timer, which can be displayed in response to the user providing a responsive input directed at the notification. A period for the timer can be set according to one or more characteristics that are associated with the notification, the user, and/or any other information that can be associated with the user receiving the notification.

17 Claims, 12 Drawing Sheets

Related U.S. Application Data

(60) Provisional application No. 62/839,401, filed on Apr. 26, 2019.

(56) References Cited

U.S. PATENT DOCUMENTS

| | | | |
|---|---|---|---|
| 2008/0046532 A1 | 2/2008 | Caspi et al. | |
| 2016/0077794 A1 | 3/2016 | Kim et al. | |
| 2018/0032503 A1* | 2/2018 | Swart .................. | G06F 16/9535 |
| 2019/0019504 A1 | 1/2019 | Hatambeiki | |
| 2021/0335356 A1 | 10/2021 | Burakov | |

OTHER PUBLICATIONS

Intellectual Property India; Examination Report issued in Application No. IN202127036547; 6 pages; dated Mar. 17, 2022.

European Patent Office; International Search Report and Written Opinion of Ser. No. PCT/US2019/035563; 17 pages; dated Jan. 28, 2020 Jan. 28, 2020.

European Patent Office; Summons issued in Application No. 19731123.6, 9 pages, dated Mar. 24, 2023.

* cited by examiner

DYNAMICALLY DELAYING EXECUTION OF AUTOMATED ASSISTANT ACTIONS AND/OR BACKGROUND APPLICATION REQUESTS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input. An automated assistant may respond to a request by providing responsive user interface output, which can include audible and/or visual user interface output.

Automated assistants can have limited availability when a user is operating other applications. As a result, a user may attempt to invoke an automated assistant to perform certain functions that the user associates with other applications, but ultimately terminate a dialog session with the automated assistant when the automated assistant cannot continue. For example, the limited availability or limited functionality of automated assistants may mean that users are unable to control other applications via voice commands processed via the automated assistant. This can waste computational resources, such as network and processing bandwidth, because any processing of spoken utterances during the dialog session would not have resulted in performance of any action(s). Furthermore, because of this deficiency, as a user interacts with their respective automated assistant, the user may avoid operating other applications that may otherwise provide efficiency for various tasks performed by the user. An example of such a task is the control of a separate hardware system, such as a heating system, air-conditioning system or other climate control system, via an application installed on the user's computing device. Such avoidance can lead to inefficiencies for any devices that might otherwise be assisted by such applications, such as smart thermostats and other application-controlled devices within the hardware system, as well as for any persons that might benefit from such applications or their control of associated devices.

Moreover, the invoking of an automated assistant while accessing an application can be assumed by many systems to be an indication that the user is no longer interested in further interactions with the application, and cause the application to pause certain operations or close. This can waste computational resources when the user is actually intending to cause the automated assistant to perform an action related to the application and/or another application. In such instances, any data previously generated during interaction with the application can be lost, thereby forcing the user to re-initialize the application and/or repeat any previous operations with the application.

SUMMARY

Some implementations set forth herein automatically determine, optionally locally at a client device, a delay for automatic performance of an assistant action. As used herein, "automatic performance" of an action can mean performance of the assistant action without first requiring explicit confirmatory user interface input. The assistant action can be generated based on user interface input (e.g., a spoken utterance) provided at an automated assistant interface of a client device that implements at least part of the automated assistant (e.g., alone and/or via interfacing with one or more remote automated assistant components). During the delay, further user interface input can be provided to prevent and/or modify performance of the assistant action. However, absent such preventing user interface input, automatic performance of the assistant action can occur. A duration of the delay is dynamically determined based on one or more dynamic considerations that are dependent on the user interface input. For example, when the user input is a spoken utterance, the duration of the delay can be based on one or more confidence metrics, which in some implementations can be based on speech-to-text conversion of the spoken utterance. Thus, duration of the delay can be based on confidence metric(s) for term(s) utilized in determining the action and/or slot value(s) for the action. Also, for example, the duration of the delay can additionally or alternatively be based on: length of slot value(s), for the action, and determined from the spoken utterance; historical likelihood(s) of the slot value(s) (across a population of users and/or for the user); commonality of natural language content of a spoken utterance from which the action and/or slot value(s) is based; a location of a user and/or a device when the spoken utterance was provided; and an event and/or other information characterizing a context in which the spoken utterance was provided.

Utilizing one or more factor(s) described above (and elsewhere herein) in determining the duration of the delay seeks to minimize the latency in performance of the assistant action, while selectively delaying the performance of the assistant action when the factor(s) indicate the action may have been improperly interpreted by the automated assistant and/or incorrectly conveyed by the user. Further, the duration of assistant action performance delay can be correlated to the extent to which the factor(s) indicate such improper interpretation and/or conveyance. In these and other manners, latency of performance of the assistant action is at least selectively reduced, which can further reduce the duration of an overall dialog session when one or more further user input(s) and/or assistant response(s) follow the performance. Further, in these and other manners, latency of performance of the assistant action is at least selectively increased to afford a user an opportunity to prevent performance of the action, thereby eliminating waste of computer and/or network resources in performance of unintended assistant actions and in performance of follow-up actions to remedy the unintended assistant actions. Thus, more generally, implementations disclosed herein seek to balance reduction of latency in performance of assistant actions with reduction in utilization in computer and/or network resources in wastefully performing unintended assistant actions.

Some implementations set forth herein additionally or alternatively relate to an automated assistant that provides an ability for a user to view a foreground application, and simultaneously use an automated assistant to control a background application. The automated assistant can be used to, for example, to respond to application notifications from the background application without wasting computational resources of either application. In some implementations, when the user is operating a first application, the user can be presented with a notification that is based on an operation of a second application. The user can elect to respond to the notification, despite actively viewing and/or interacting with the first application in a foreground of a display panel. In order to respond to the notification, the user can provide an input that is directed at an automated assistant, which can determine that the input is responsive to the notification from the second application. The responsive input can be processed to identify an action for the second application to perform, such as sending a message, and the action can be performed in the background with or without further confirmation from the user.

The automated assistant can determine whether to query the user for confirmation depending on a variety of different information that is available to the automated assistant. For instance, the user can receive a notification (e.g., "John says: 'Are you here?'") related to the second application, while the user is operating the first application (e.g., a podcast application) in the foreground of a graphical user interface of a computing device. When the user provides a spoken utterance (e.g., "I'm on the way.") in response to seeing the notification, content of the spoken utterance can be used by the automated assistant to generate a responsive message (e.g., "Draft Message: 'I'm on the way.'"). Depending on information associated with and/or characterizing the notification, the automated assistant can elect to cause an action-impending notification to be rendered at the graphical user interface of the computing device, or, alternatively, elect to bypass providing the action-impending notification.

In some implementations, the action-impending notification can be rendered by the automated assistant in order to provide a chance for the user to confirm and/or modify an impending action before the impending action is executed. Furthermore, this action-impending notification can be bypassed when the impending action is determined to be one that the user would not typically desire to confirm and/or modify. For instance, when the user is operating a first application, such as a map application, at a computing device, and a notification for a second application, such as a messaging application, is received at the computing device, the user can be notified of the message. For example, the received message can be from a friend names, "Matt," that the user frequently messages, and the notification can be, "Matt: 'What is your ETA?'" Upon viewing the notification appear briefly in the foreground of the graphical interface of the computing device, the user can reply with a spoken utterance such as, "25 minutes." In response to receiving the spoken utterance, the automated assistant can determine a confidence metric that indicates a confidence in predicting whether the user would confirm and/or modify the message. If the confidence metric satisfies a threshold thereby indicating that the user is predicted to not desire to confirm and/or modify the message, the message can be transmitted without providing an action-impending notification. However, if the confidence metric does not satisfy the threshold, the action-impending notification can be rendered for a duration of time and/or until the user elects to confirm and/or modify a corresponding action request.

In some implementations, the automated assistant can bias a decision of the application to select for receiving the action request based on which application most recently provided an output and/or received an input. For example, because the second application most recently provided the notification regarding the message from "Matt," the automated assistant can select the second application as being subject to an action. Therefore, when the automated assistant has selected the second application for being subject to a subsequent action, the automated assistant can generate an action request in furtherance of the second application performing a particular action.

In some implementations, the automated assistant can interact with the second application, and/or the second application can interact with the automated assistant, via an application programming interface (API). The automated assistant and the second application can interact with each other in furtherance of the automated assistant generating an action request that corresponds to a particular action that is capable of being performed by the second application. For example, based on the second application providing the notification, the second application can push action data to the automated assistant using an API, in order to assist the automated assistant with selecting an action to which the action request should be directed. For instance, in accordance with the aforementioned example, the second application can push action data such as, "{Response_Message (Recipient: ["Matt", . . . ]; Body: [message content, . . . ]; . . . )}," which can be used by the automated assistant to generate the action request. Specifically, the action request can include data that correlates natural language content to the "Body" of the "Response_Message" action.

The automated assistant can also generate a confidence metric when determining how to respond to the spoken utterance from the user. The confidence metric may reflect a calculated likelihood that the user would confirm and/or modify the action request before the action request is provided to the second application. The confidence metric may also reflect a perceived cost of performing the action in error (for example, a computational cost in network or other resources). For instance, if the confidence metric is determined to not satisfy a particular threshold, the automated assistant can cause an action-impending notification to be rendered at the display panel. The action-impending notification can indicate that the user can confirm and/or modify the action request prior to the action request being provided, via the automated assistant, to the second application. However, if the confidence metric is determine to satisfy the particular threshold, the automated assistant can bypass causing the action-impending notification to be rendered at the display panel. Furthermore, along with bypassing causing the action-impending notification to be presented at the display panel, the automated assistant can provide the action request to the second application in order for the second application to perform the action (e.g., sending the message, "25 minutes," to a stored contact named "Matt").

In some implementations, when the action-impending notification is rendered at a display panel, a duration in which the action-impending notification is rendered at the display panel can be based on the confidence metric. For example, the confidence metric can be determined from data that characterizes one or more different properties and/or aspects of the input from the user and/or the determined action to be performed. For example, when the input from the user corresponds to a responsive message that is similar to a particular message that the user and/or one or more other users has a history of sending, the confidence metric can be higher, at least relative to another confidence metric corresponding to another responsive message that is rarely sent by the user and/or the one or more other users. Additionally, or alternatively, when the input from the user corresponds to a responsive message directed at a recipient that the user frequently messages, the confidence metric can be higher, at least relative to another confidence metric corresponding to another responsive message that is directed at another recipient message less frequently. Additionally, or alternatively, the confidence metric can be based on: an importance of a particular action that the input is directed to, when the input corresponds to a message that has been auto-corrected, a location of the user when providing the input, an event that is associated with the input or ongoing when the input was provided, an amount of data and/or type of data incorporated into the input, and/or any other information that can be associated with the input.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
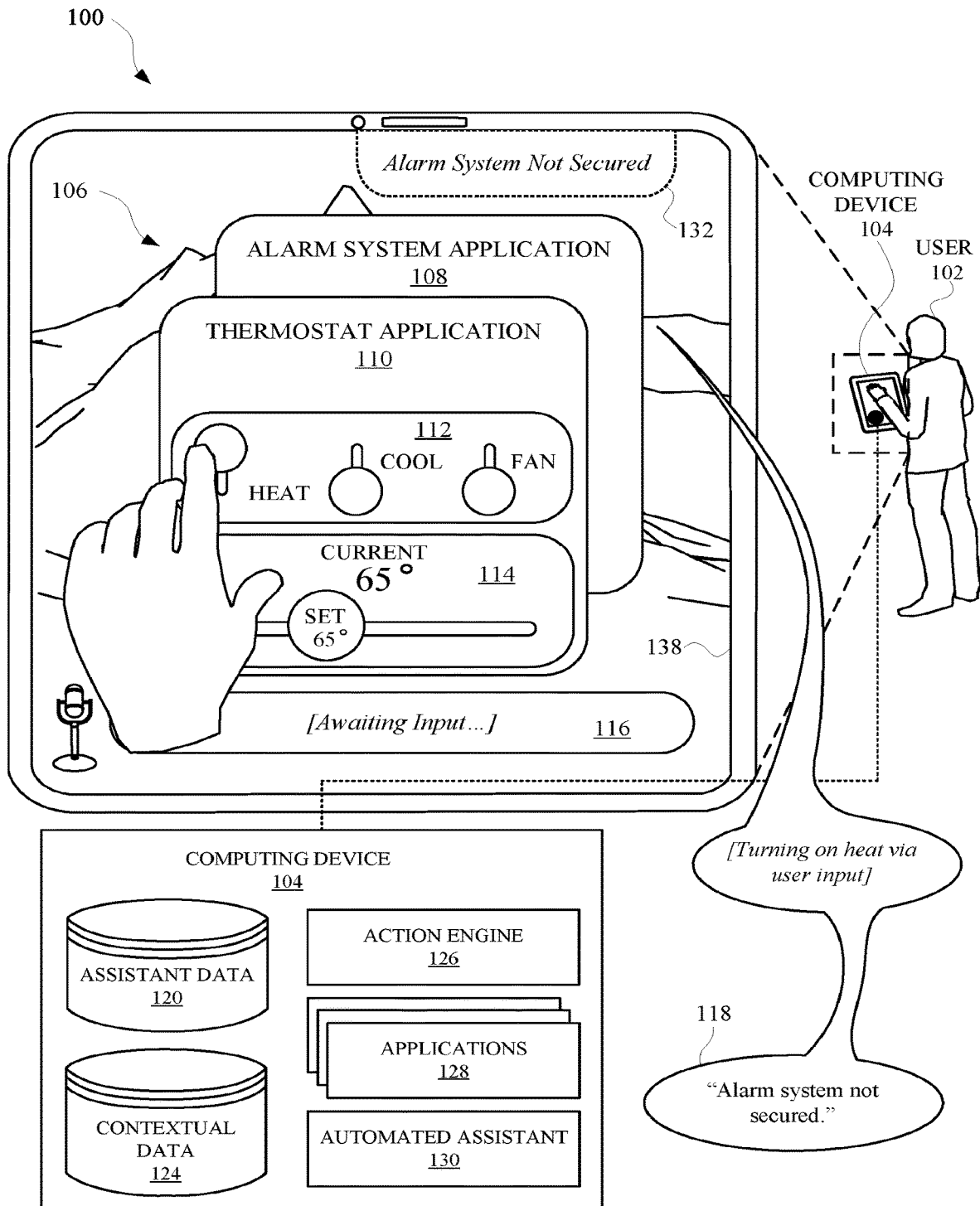
FIG. 1A, FIG. 1B, FIG. 1C, FIG. 1D, FIG. 1E and FIG. 1F illustrate a dynamic delay being employed in a variety of different circumstances prior to initialization of an action.

FIG. 1A through FIG. 1F illustrate how a duration of a dynamic delay for an action can be employed in a variety of different circumstances and prior to initialization of the action. Specifically, FIG. 1A illustrates a view 100 of a user 102 controlling a first application that is rendered in a foreground of a graphical user interface 106, while a second application provides a notification and is executing in a background of the graphical user interface 106. The first application can be a thermostat application 110, which can provide a first user interface 112 for controlling different features of the thermostat application 110, and a second user interface 114 for controlling a temperature setting of the thermostat application 110. The second application can be an alarm system application 108 that is executing in a background, or at least not entirely in the foreground, of the graphical user interface 106. Despite operating in the background, the alarm system application 108 can cause notifications 132 to be pushed to the operating system and/or an automated assistant 130 of the computing device 104. The notification provided by the alarm system application 108 can then be rendered at the display panel 138 of the computing device 104.

The notification 132 can indicate that an alarm system, which is controlled by the alarm system application 108, is not secured (i.e., not actively monitoring a residence of the user 102). The computing device 104 can optionally cause an output 118 to be rendered in response to the pushed notification from the alarm system application 108. The notification 132 can be rendered when the user 102 is interacting with thermostat application 110 and turning on the heat of their home. In order to streamline securing the alarm system, and without having to abruptly stop what they are doing with thermostat application 110, the user 102 can provide an input to the automated assistant 130, which can be awaiting input from the user 102, as indicated by a status 116 of the automated assistant 130.

Figure 1B:
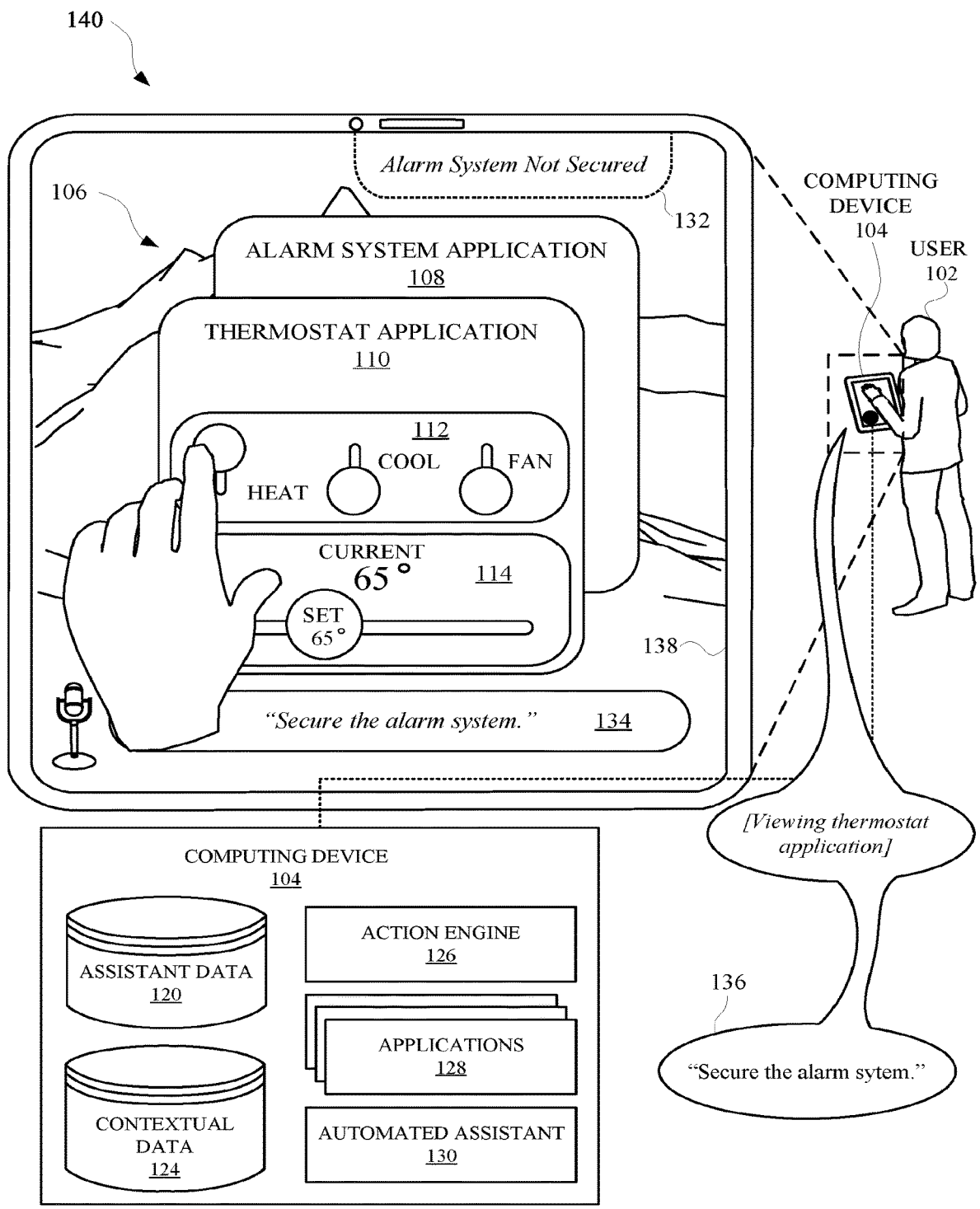

FIG. 1B illustrates a view 140 of the user 102 providing a spoken utterance 136 for controlling the background application while interacting with a foreground application. Specifically, the user 102 can provide a spoken utterance 136 such as, "secure the alarm system," which can be received as an input 134 to the automated assistant 130. The automated assistant 130 can process the input 134 to identify an intent that the user 102 is intending to initialize. In some implementations, an action engine 126 of the computing device 104 can generate an action request corresponding to the intent for an action and/or an application of one or more applications 128 that are accessible via the computing device 104.

In some implementations, the computing device 104 can also generate one or more confidence metrics for determining whether to provide some amount of delay before providing the action request to the alarm system application 108. In other words, given the current context, there may be some actions that the user would want to confirm or modify before the actions are initialized, and there are other actions that the user may not desire to confirm or modify before the actions are initialized. A determination of whether to enforce a delay can be based on assistant data 120 and/or contextual data 124, which can be processed to determine a confidence metric that can provide an indication of whether to enforce the delay before providing the action request to the alarm system application 108.

For example, when the contextual data 124 and/or the assistant data 120 indicates that the user has previously provided the spoken utterance 136 multiple times without subsequently requesting to modify a resulting action, the confidence metric can be generated to eliminate the delay before initializing the action. Alternatively, or additionally, the contextual data 124 can indicate that the alarm system application 108 has provided a most recent notification 132, relative to other notifications pushed by other applications 128 accessible via the computing device 104. Therefore, because the spoken utterance 136 and/or the action request corresponds to an action to be performed by the alarm system application 108, and the alarm system application 108 provided the most recent notification 132, the confidence metric can be generated such that a delay is bypassed, or otherwise not enforced, before initializing the action of securing the alarm system. In some implementations, a trained machine learning model that is provided at the computing device 104, and/or another device that is in communication with the computing device 104, can be used to process various data for generating one or more confidence metrics. For example, the assistant data 120 and/or the contextual data 124 can be processed using the trained machine learning model in order to generate a confidence metric for determining whether to provide a delay before initializing the action.

Figure 1C:
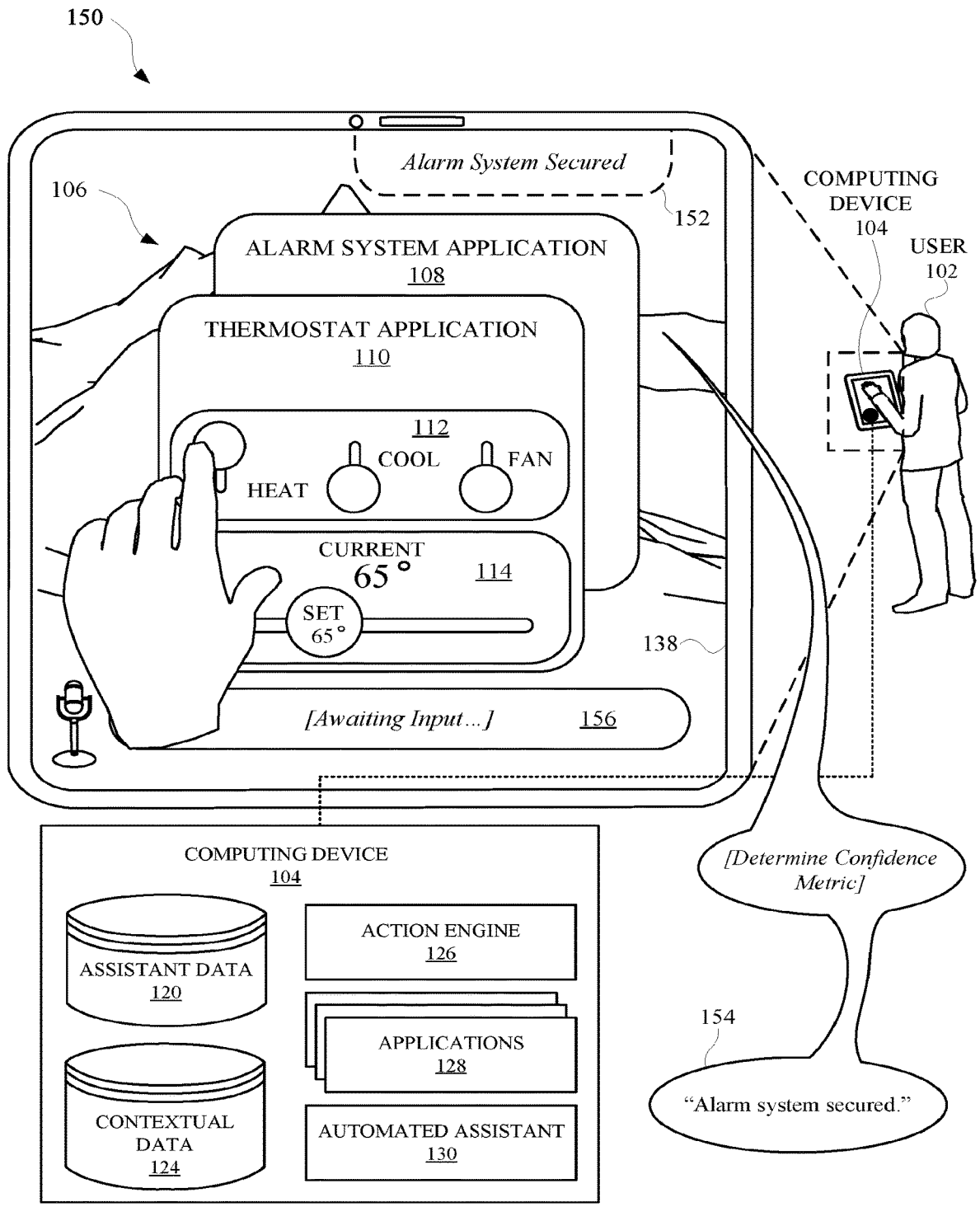

FIG. 1C illustrates a view 150 of the automated assistant 130 causing, prior to initializing an action, a delay to be bypassed based on a determined confidence metric. Specifically, upon determining the confidence metric, the automated assistant 130 can determine whether to employ a delay before initializing an action requested by the user 102. In some implementations, when the confidence metric satisfies a particular threshold, the action request generated by the automated assistant 130 can be transmitted to the alarm system application 108 without incorporating a delay. Rather, the automated assistant 130 can transmit the action request, via an operating system, to the background application, in order to cause the background application to perform the action. In response to receiving the action request, the alarm system application 108 can perform the action of securing the alarm system, and optionally provide another notification 152 indicating that the action was successfully performed. The automated assistant 130 can also provide an output 154 indicating that the alarm system is secured, and may thereafter provide an updated status 156 indicating that the automated assistant 130 is awaiting further input.

As a result of bypassing a delay before initializing an action, wasteful latency exhibited prior to initializing an action can be eliminated in order that performance of the action can be expedited. This can be especially important in situations that involve an alarm system, which should operate with minimal latency in order to protect the user 102. Furthermore, this allows for reduced latency among all applications 128 as a user continues to interact with the automated assistant 130 to control the applications 128. For instance, as a result of the automated assistant 130 being used to frequently perform certain actions, a corresponding confidence metric for each action and/or spoken utterance can increase, thereby reducing the delay between a user input to the automated assistant 130 and the initialization of a corresponding action. Furthermore, by employing a dynamic delay in some instances, the user 102 can be provided with an adaptive process through which to confirm or modify action requests that the user is only beginning to request via the automated assistant 130. This can assist with training of one or more trained machine learning models, thereby providing a more accurate confidence metric from which to bypass the enforcement of the delay, and/or select a duration for the delay.

Figure 1D:
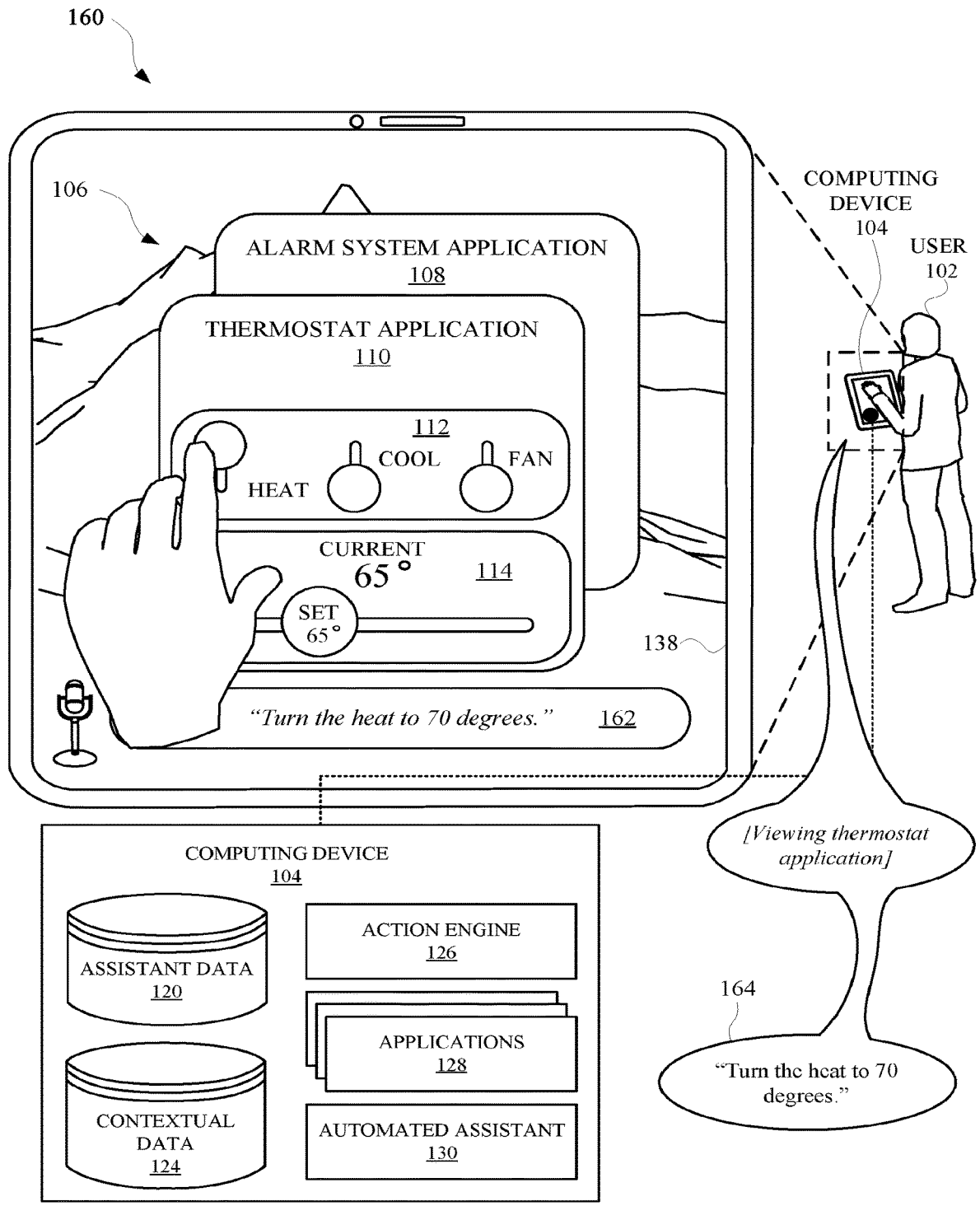

FIG. 1D illustrates a view 160 of the user 102 providing a spoken utterance 164, which can correspond to an action request that can be delayed according to a dynamic duration selected via the automated assistant 130. The spoken utterance 164 can be provided by the user 102 while a foreground application, such as thermostat application 110, and a background application, such as the alarm system application 108, are executing at the computing device 104. A spoken utterance 164 can be processed as an input 162 to the automated assistant 130 while the user 102 is viewing thermostat application 110. In response to receiving the spoken utterance 164, the automated assistant 130 can identify an action and/or an application corresponding to the spoken utterance 164.

Figure 1E:
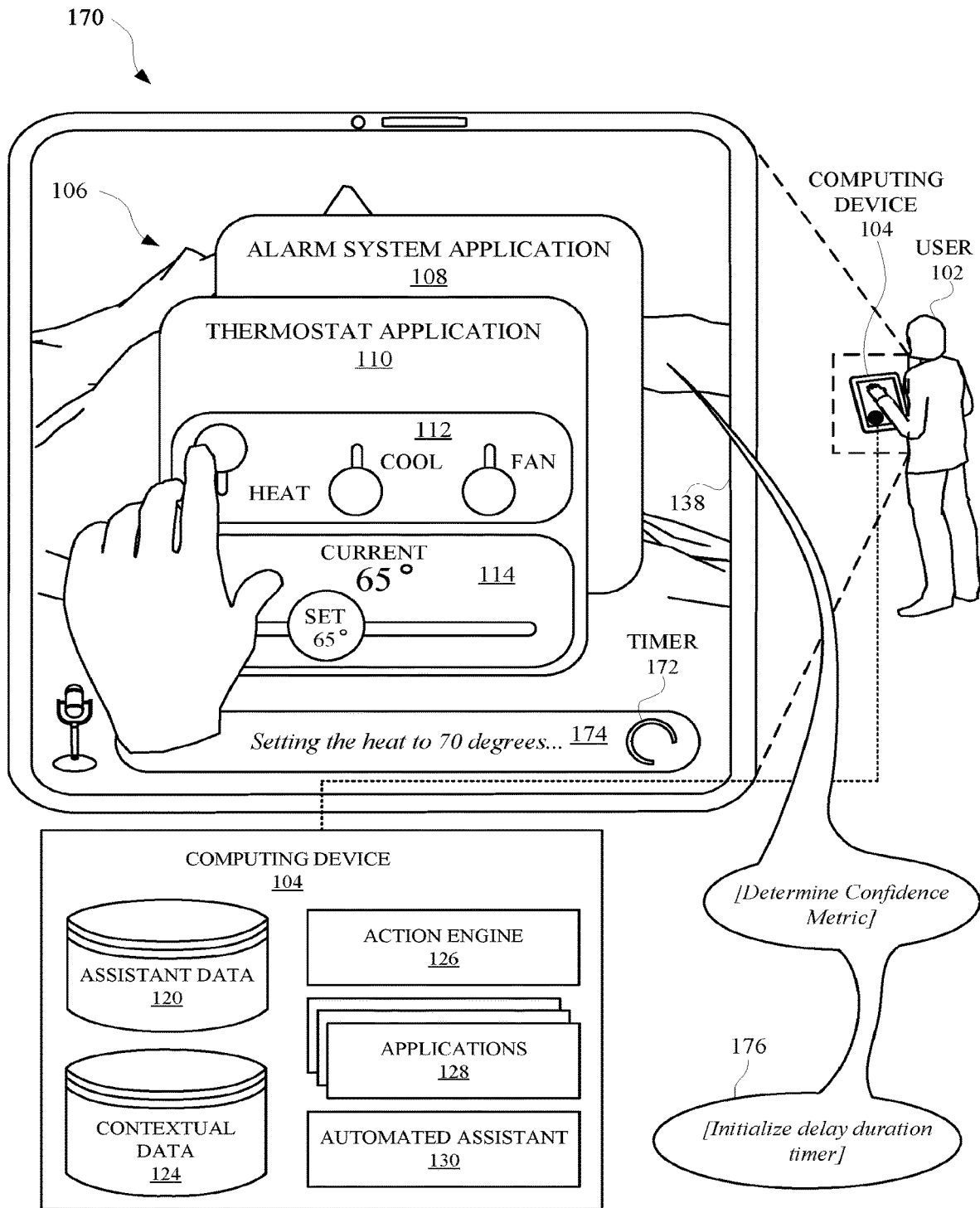
Figure 1F:
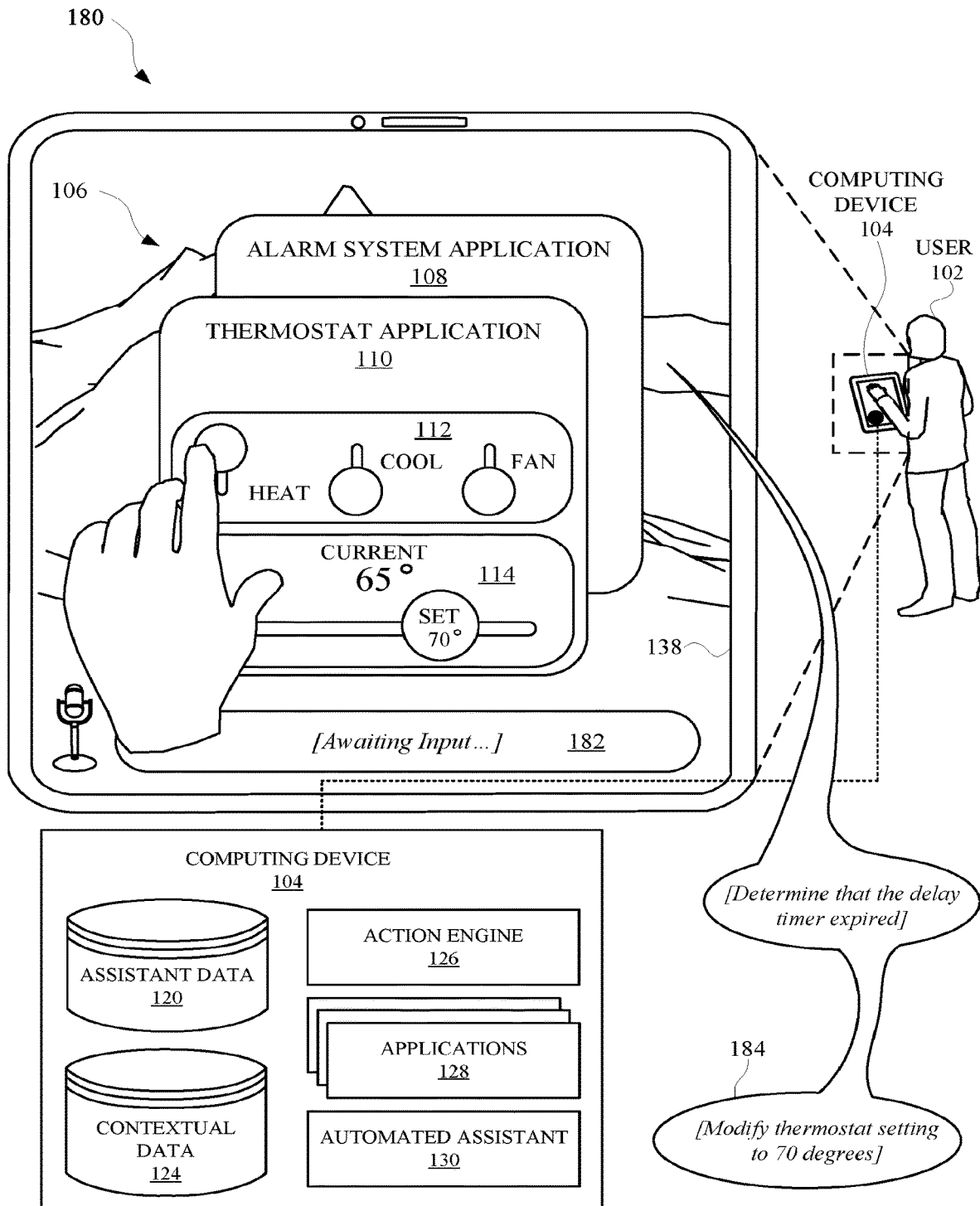

FIG. 1E illustrates a view 170 of the computing device 104 determining the confidence metric in response to the spoken utterance 164, and providing an action impending notification 174 based on the confidence metric. The confidence metric can be based on a variety of different data, which can indicate that the user 102 has provided the spoken utterance 164 less frequently than the spoken utterance 136. As a result, the confidence metric that is generated based on the spoken utterance 164 can be less than the confidence metric that is based on the spoken utterance 136. In some implementations, the confidence metric and/or another confidence metric can be generated at the computing device 104 to determine a duration for a timer 172, which can provide a real-time expiration for the delay before providing the action request to a respective application. For instance, when the confidence metric does not satisfy a threshold for omitting the action impending notification 174, the confidence metric can nonetheless be used to determine the duration for the timer 172.

In some implementations, the confidence metric can be based on an amount of content provided in the spoken utterance 164, and therefore the duration for the timer 172 can be directly proportional to, or increase with, the length of the spoken utterance from the user 102. Alternatively, or additionally, the confidence metric can be generated based on whether most of the content of the spoken utterance incorporates terms commonly used by the user 102 and/or one or more other users. Therefore, when the spoken utterance 164 includes terms that are least commonly used by the user 102 and/or one or more other users, the confidence metric can be lower relative to if the user had incorporated more commonly used terms. Furthermore, the duration for the timer 172 can be set to a longer length when less commonly used terms are incorporated into a spoken utterance, at least relative to a set duration for the timer 172 when the user 102 has incorporated more commonly used terms.

In some implementations, the action impending notification 174 can provide the user with an ability to modify the impending action of setting the heat to 70° by tapping a portion of the action impending notification 174. Alternatively, or additionally, the user can provide a subsequent spoken utterance such as, "confirmed," or tap a different portion of the action impending notification 174, in order to confirm the action request prior to the automated assistant 130 submitting the action request to thermostat application 110. Alternatively, or additionally, the user 102 can wait for the expiration of the timer 172 so that, when the timer 172 expires, the action request will be submitted to thermostat application 110.

FIG. IF illustrates a view 180 of the automated assistant 130 providing the action request to thermostat application 110 in response to the expiration of the timer 172. Because the user 102 allowed the timer 172 to expire, the automated assistant 130 can acknowledge the expiration of the timer and, in response, provide the generated action request to thermostat application 110. The action request can cause the thermostat application 110 to initialize an action of modifying thermostat setting to 70 degrees, as indicated by output 184. Furthermore, the automated assistant 130 can provide an updated status 182 indicating that the automated assistant 130 is awaiting further input from the user 102. The user 102 can continue to interact with thermostat application 110 and/or the alarm system application 108 via the graphical user interface 106, spoken input, and/or any other input that can be received by the computing device 104. However, each spoken input can be processed to identify an intended action, determine whether to delay for a duration of time prior to initializing the action, and optionally determining a duration for the delay based on the action, the spoken input, one or more confidence metrics, and/or any other information that can be associated with spoken input.

Figure 2A:
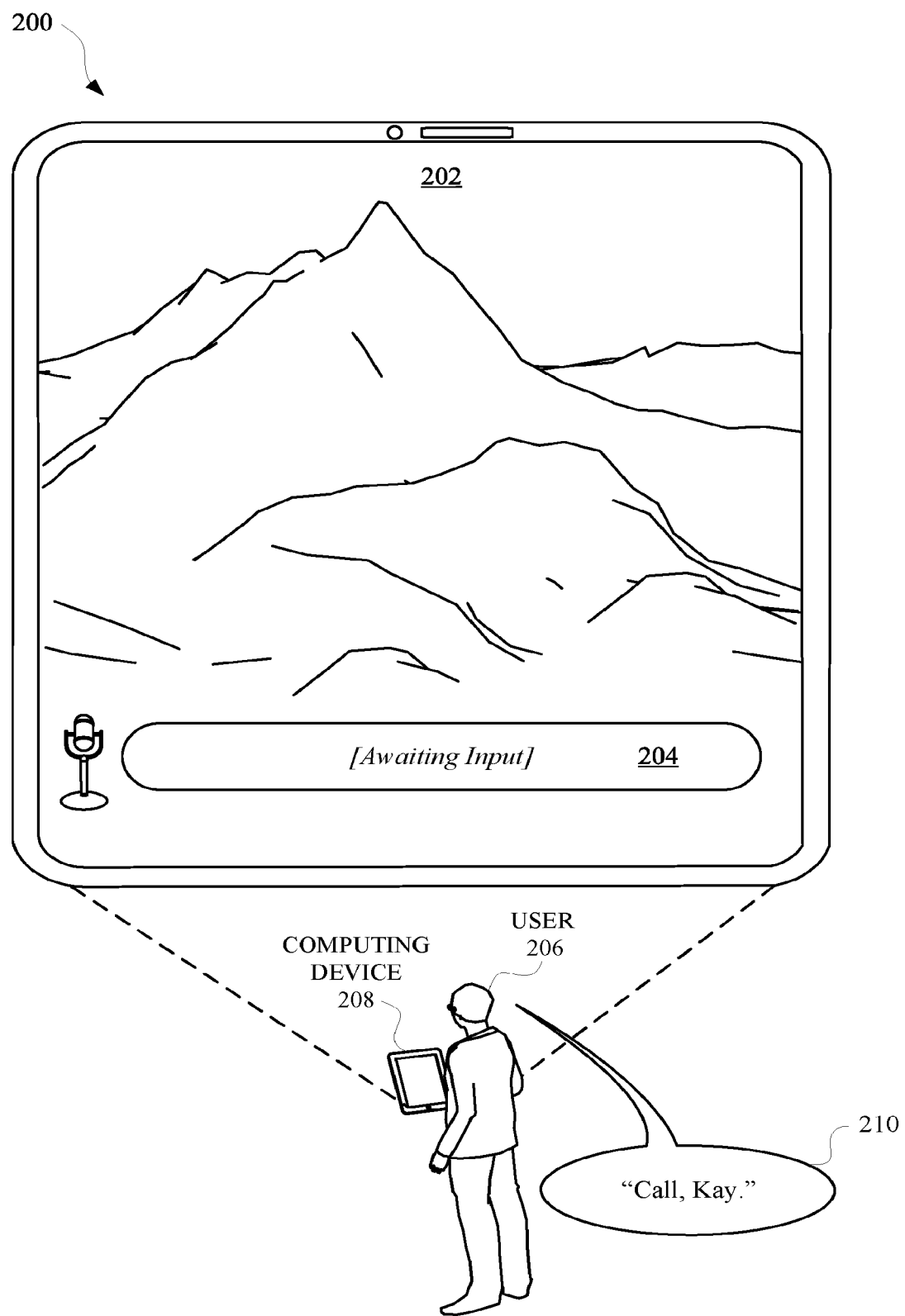
FIG. 2A, FIG. 2B, and FIG. 2C illustrate a dynamic delay being generated and employed prior to initializing an action requested by a user.
Figure 2B:
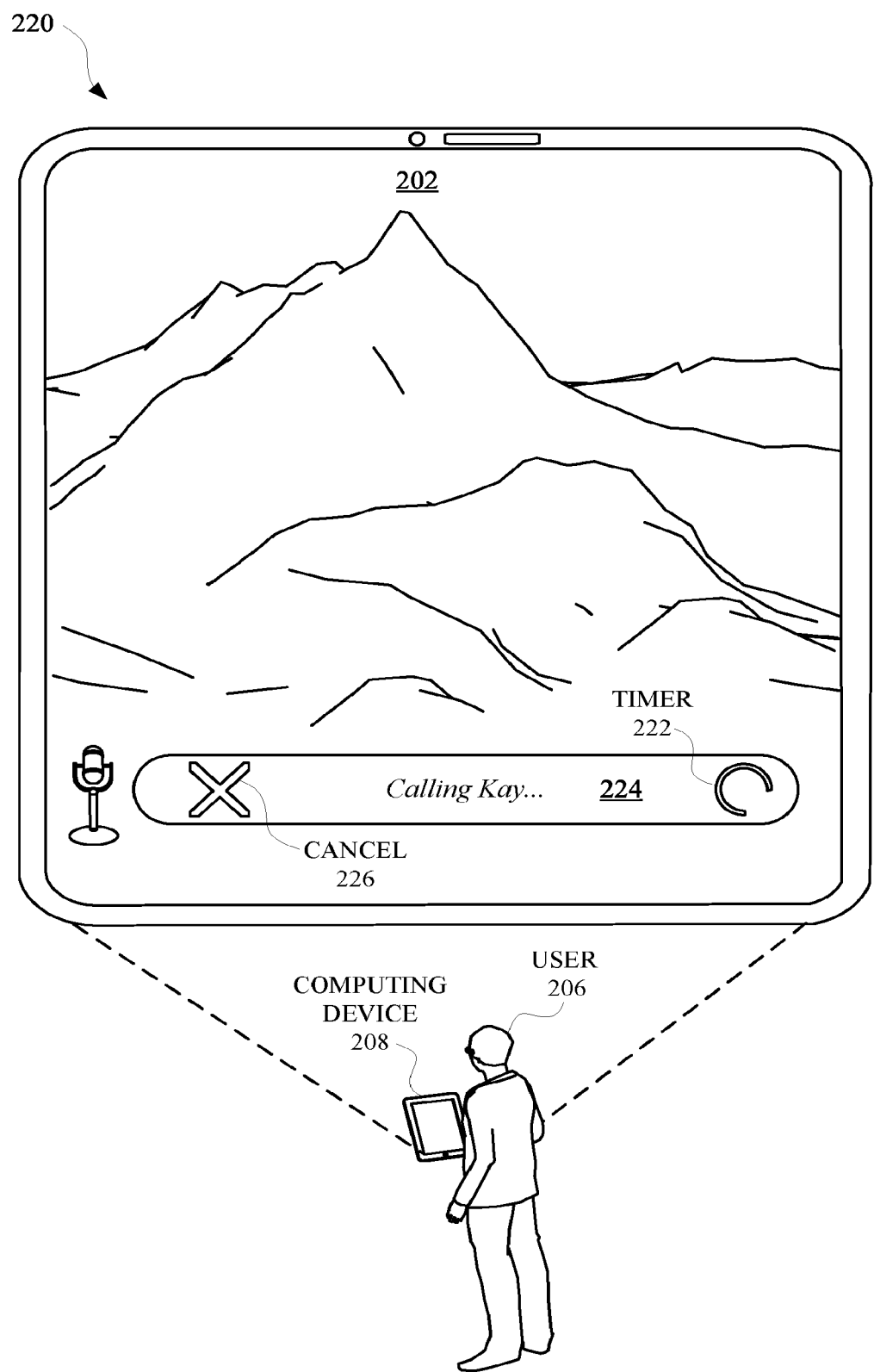
Figure 2C:
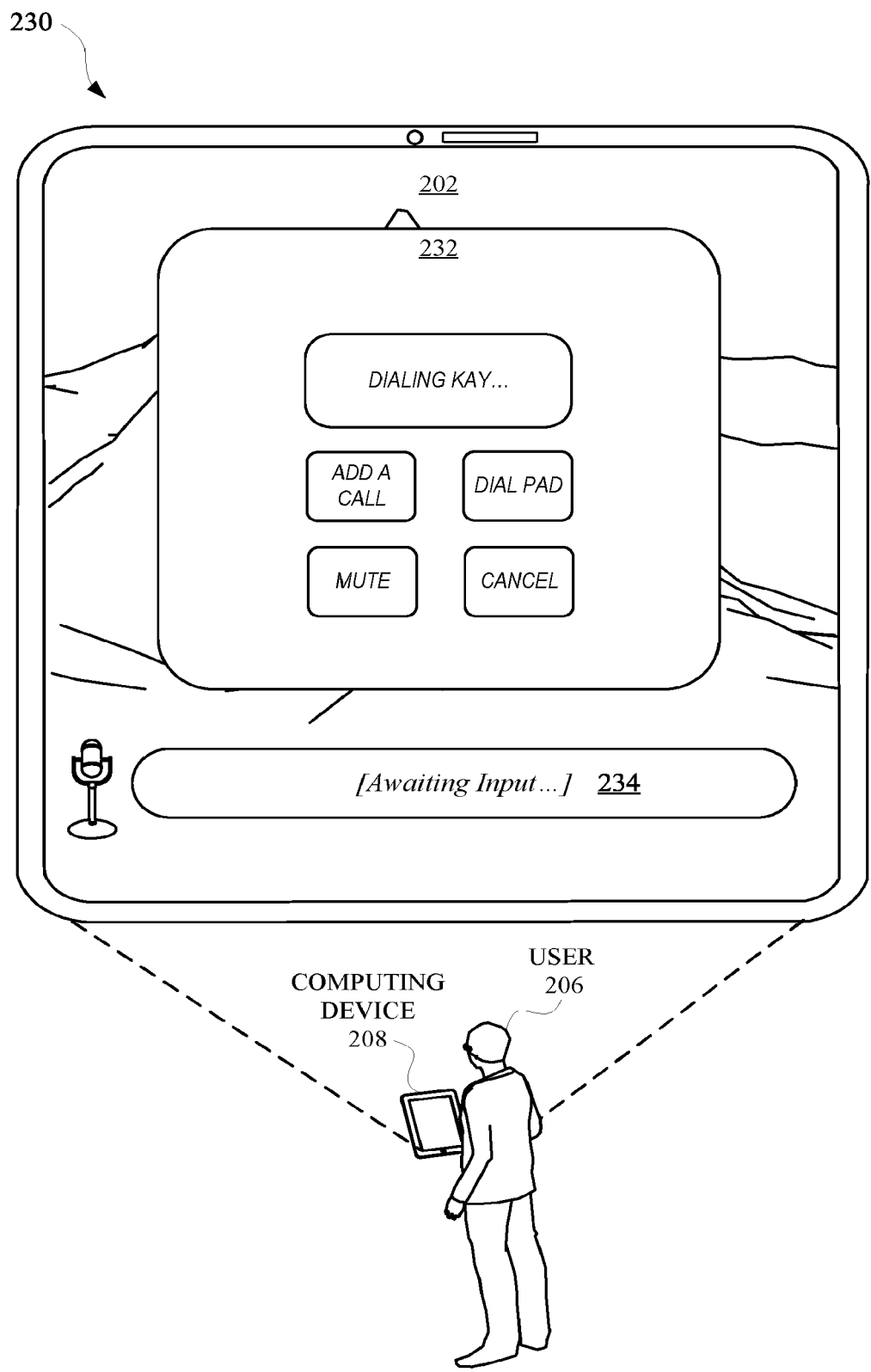

FIGS. 2A through FIG. 2C illustrate a delay being employed prior to initializing an action requested by a user 206. Specifically, FIG. 2A illustrates a view 200 of a user 206 invoking an automated assistant to performing an action and when the computing device 208 may not be actively executing a third-party application in a foreground of a graphical user interface 202 of the computing device 208. For instance, an automated assistant that is accessible via the computing device 208 can be in an idle mode, or otherwise awaiting input from the user 206, as indicated by a status 204. While accessing the computing device 208, the user 206 can provide a spoken utterance 210 such as, "Call, Kay," which can correspond to a request for the automated assistant to initialize a phone call to a contact (e.g., "Kay") stored in association with an account of the user 206. The spoken utterance 210 can be received at a microphone of the computing device 208 and converted into audio data, which can be processed on-device using speech-to-text processing and/or natural language understanding processing. Based on the processing of the audio data, an action request can be generated for transmitting to a respective application to initialize an action, such as to a phone call application that can perform a calling action. However, based on the content of the spoken utterance 210, the action request, and/or any other information that can be associated with the interaction between the user 206 and the automated assistant, a confidence metric can be generated to determine whether to delay initialization of the calling action.

In some implementations, information characterizing the interaction between the user 206 and the automated assistant can be processed using a trained machine learning model, in order to assist in generating a confidence metric. For example, with prior permission from the user, information associated with the user 206 and the contact can be processed to determine a frequency with which the user 206 communicates with the contact. Furthermore, the information can also be used to determine a frequency with which the user invokes the automated assistant to perform phone calls. If the user 206 frequently contacts the contact that is the subject of the spoken utterance 210 (e.g., at least more frequently than one or more other contacts), and the user 206 frequently invokes the automated assistant to perform phone calls (e.g., at least more frequently than the user invokes the automated assistant to perform other actions), the confidence metric can satisfy a threshold for bypassing delaying initialization of the requested action. In other words, the automated assistant can bypass delaying the calling action in response to the spoken utterance 210, and the call to "Kay" can be initialized via the automated assistant. However, when the confidence metric is determined to not satisfy a particular confidence metric threshold, which can vary according to a context in which the user 206 is interacting with the automated assistant, the automated assistant can elect to execute a delay prior to the initialization of the action. In some implementations, the confidence metric threshold can be static or dynamic, and can also be based on a variety of different data such as that user, a context of an interaction, one or more action, one or more applications, other data generated using a trained machine learning model, and/or any other information that can be used to generate a metric.

FIG. 2B illustrates a view 220 of the automated assistant causing an action impending notification 224 to be rendered at the graphical user interface 202. In some implementations, an optional timer 222 can be rendered with the action impending notification 224. The timer 222 can provide a real-time indication of an expiration for the duration of the delay, which can begin expiring when the action impending notification 224 is provided at the graphical user interface 202. Furthermore, the action impending notification 224 can include a cancel element 226, which can cancel the impending action (e.g., the calling action) if the cancel element 226 is selected during the duration of the delay. Moreover, the user can tap a portion of the action impending notification 224 that does not include the cancel element 226 or the timer 222 in order to confirm the impending action. By confirming the impending action before expiration of the delay timer 222, the user 206 can cause the impending action to be initialized prior to the expiration of the delay.

For example, and as illustrated in view 230 of FIG. 2C, the user 206 can initialize performance of the calling action by confirming the action impending notification 224 and/or awaiting expiration of the timer 222. The automated assistant can initialize performance of the calling action, which can result in an application interface 232 being rendered in a foreground of the graphical user interface 202. In some implementations, in response to the user 206 confirming the action via the action impending notification 224, or awaiting expiration of the delay timer 222, a trained machine learning model can be modified on-device in order to effect subsequent generations of confidence metrics. In this way, as the user subsequently confirms the calling action more readily in a given context, the confidence metric can be increased as a result of processing one or more inputs via the trained machine learning model. Once the subsequent iterations of the confidence metric satisfy a confidence metric threshold, the automated assistant can bypass delaying the calling action in certain contexts.

In some implementations, data can characterize interactions between the user 206 and the automated assistant when requesting an action, when an action impending notification is provided, when an action request is transmitted to another application, and/or during execution of an action. This data can be used to train a machine learning model that is used to process inputs that are received according to a federated learning process. For example, the federated learning process can be effectuated using one or more server devices that are in communication with one or more client devices. As users interact with their respective automated assistants via their respective client devices, each client device, with prior permission from the user, can provide data characterizing the interactions between the user and the automated assistant. This data can be used to train a machine learning model, and the trained machine learning model, and/or a gradient derived therefrom, can be used by each client device for generating confidence metrics. Therefore, as multiple different users confirm certain action impending requests, cancel certain action requests, and/or otherwise use features for bypassing the delay of an action, the trained machine learning model can be updated for use when generating subsequent confidence metrics.

For example, as multiple different users confirm an alarm system "on" action while interacting with their respective automated assistant in their respective home, the federated learning process can be used to train a machine learning model that will reflect this increase in similar interactions. As a result, confidence metrics subsequently generated in response to a user requesting the alarm system "on" action in their home, can satisfy a particular threshold, which can result in bypassing a delay in performance of the alarm system "on" action. In this way, wasteful latency that might otherwise be exhibited by an automated assistant can be eliminated, thereby streamlining certain actions that a user would not desire to confirm or modify. Furthermore, some processes can promote user modification and/or confirmation of certain actions that are seemingly important or crucial to the user, such as messaging or calling certain contacts having a certain title, and/or while in certain circumstances such as driving a vehicle, operating a particular smart device, traveling through a hazardous area, and/or otherwise interacting with the automated assistant when a user may desire additional opportunities to confirm or modify requested actions.

Figure 3:
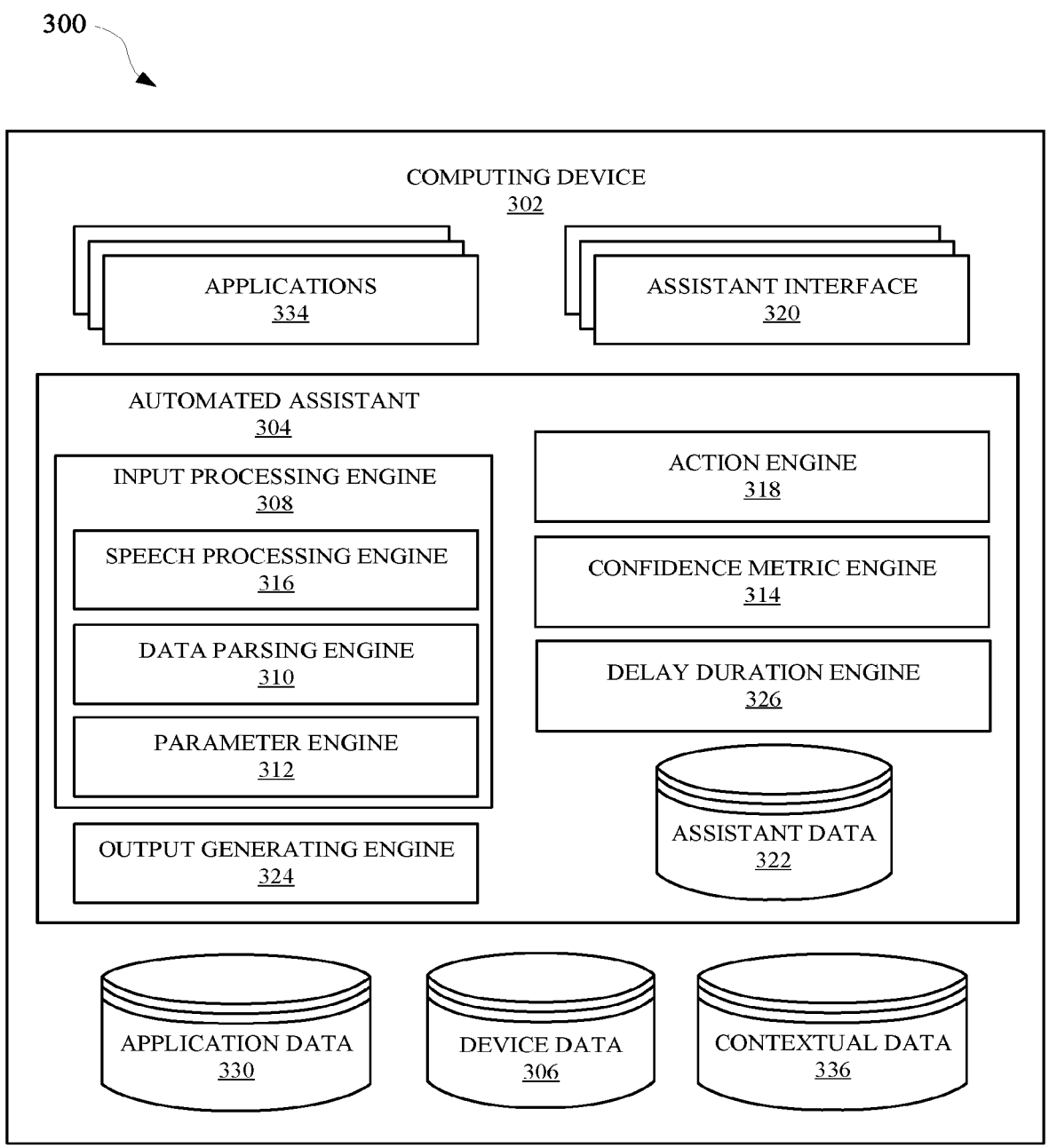
FIG. 3 illustrates a system for automatically determining whether to delay—and an amount of delay, before automatically performance of an application action via an automated assistant.

FIG. 3 illustrates a system 300 for automatically determining whether to delay—and an amount of delay, before automatic performance of an application action via an automated assistant 304. The automated assistant 304 can operate as part of an assistant application that is provided at one or more computing devices, such as a computing device 302 and/or a server device. A user can interact with the automated assistant 304 via an assistant interface 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 308, which can employ multiple different modules and/or engines for processing inputs and/or outputs for the computing device 302 and/or a server device. For instance, the input processing engine 308 can include a speech processing engine 316, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 322 can be stored at the server device and/or the computing device 302, and can include data that defines one or more actions capable of being performed by the automated assistant 304, as well as parameters necessary to perform the actions. The assistant data 322 generated via the input processing engine 308 can be processed by an output generating engine 324, in order to cause the automated assistant 304 to provide an output to the user via an assistant interface 320, and/or initialize one or more actions associated with one or more applications 334.

In some implementations, the computing device 302 can include one or more applications 334, which can be provided by a third-party entity that is different from an entity that provided the computing device 302 and/or the automated assistant 304. An action engine 318 of the automated assistant 304 and/or the computing device 302 can access application data 330 to determine one or more actions capable of being performed by one or more applications 334. Furthermore, the application data 330 and/or any other data (e.g., device data 306) can be accessed by the automated assistant 304 to generate contextual data 336, which can characterize a context in which a particular application 334 is executing at the computing device 302, and/or a context in which a particular user is accessing the automated assistant 304 and/or the computing device 302.

While one or more applications 334 are executing at the computing device 302, the device data 306 can characterize a current operating status of each application 334 executing at the computing device 302. Furthermore, the application data 330 can characterize one or more features of an executing application 334, such as content of one or more graphical user interfaces being rendered at the direction of one or more applications 334. In some implementations, the action engine 318 can initialize performance of one or more actions of an application 334 at the direction of the automated assistant 304. Furthermore, the action engine 318 and/or the automated assistant 304 can use metrics determined by the confidence metric engine 314 in order to prioritize and/or rank application actions identified by the automated assistant 304 in response to a spoken utterance. Additionally, or alternatively, the metrics can be used by a delay duration engine 326 for determining whether to delay an action that is to be initialized in response to a user input, and a duration for the delay of the action.

Initialization of an action can be delayed in order to give the user an opportunity to confirm or modify an action request prior to the automated assistant providing the action request to a particular application. As an example, the computing device 302 can be executing a first application in a foreground of a graphical user interface, and a second application in a background of the graphical user interface. During this time, the second application can cause a notification to be provided in the foreground of the graphical user interface, and the notification can include content to which the user is being requested to respond to. For example, the second application can be a messaging application, and the notification can correspond to a new message from a particular contact. Data characterizing the notification can be stored with the application data 330, which can be accessible to the automated assistant 304. In response to acknowledging the notification from the second application, the user can provide an input to an assistant interface 320 of the computing device 302 for responding to the content of the notification. Audio data characterizing the spoken utterance can be processed at the input processing engine 308, and, thereafter, input data that is based on the spoken utterance can be processed at the action engine 318. The action engine 318 can identify an application and/or an action that the user is intending to invoke and/or initialize beyond the spoken utterance. Furthermore, the confidence metric engine 314 can also process the input data, or other data, to determine whether initialization of the action should be delayed.

The confidence metric engine 314 can determine a confidence metric, which can be used to determine whether to delay initialization of the requested action. The confidence metric engine 314 can use application data 330, device data 306, contextual data 336, assistant data 322, and/or any other information that can be associated with the requested action. For example, the application data 330 can indicate a frequency with which the user requests performance of a requested action. Alternatively, or additionally, the contextual data 336 can characterize a context in which the user provided the spoken utterance for requesting performance of the action. Alternatively, or additionally, the assistant data 322 can characterize historical interactions between the user and the automated assistant 304. Based on some or all of this data, the confidence metric engine 314 can generate one or more confidence metrics that can be used to determine whether to delay initialization of the requested action, When the determined confidence metric indicates that initialization of the requested action should be delayed, the delay duration engine 326 can determine, using the confidence metric, a length of duration for the delay. For example, in some implementations, the length of duration for the delay can be directly proportional to an amount of natural language content provided in the spoken utterance. Alternatively, or additionally, an amount of delay can be indirectly proportional to a frequency with which the user causes the identified action to perform the requested action. Alternatively, or additionally, a length of duration for the delay can be determined based on a location and/or context of the user as characterized by the contextual data 336. For example, when the user is indicated to have provided the spoken utterance during an event that is stored in their calendar, the action can be delayed when the action is determined by the automated assistant to be unrelated to the calendar event. However, when the action is determined to be related to the calendar event, such as when the user is requesting that the automated assistant send a message to an invitee of the calendar event, the automated assistant can cause the delay of the initialization of the action to be bypassed. This can reduce latency often exhibited when requesting performance of certain actions, as well as improve the accuracy of certain actions that the user may desire to reflect on or otherwise give additional attention to. By improving such accuracy, computational resources related to repeating actions and/or correcting actions can be preserved, as the user would be repeating and/or correcting actions less frequently.

Figure 4:
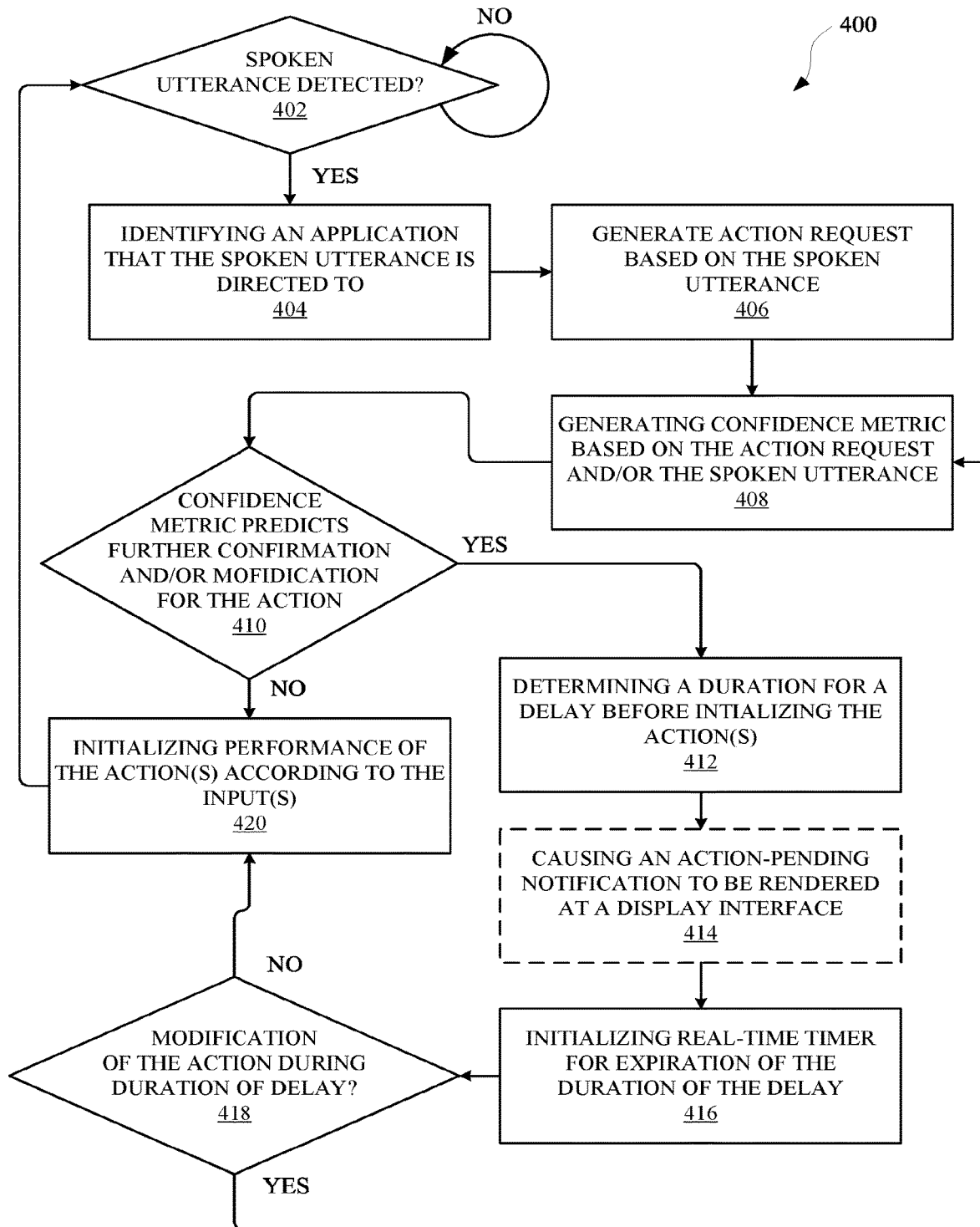
FIG. 4 illustrates a method for dynamically delaying performance of an action based on a variety of different factors, as well as bypassing delaying performance of the action based on such factors.

FIG. 4 illustrates a method 400 for dynamically delaying performance of an action based on a variety of different factors, as well as bypassing delaying performance of other actions based on such factors. The method 400 can be performed by one or more computing devices, applications, and/or any other apparatus, module, and/or engine capable of initializing performance of an action. The method 400 can include an operation 402 of determining whether a spoken utterance has been detected at a computing device. A spoken utterance can be a spoken input provided by one or more users to one or more interfaces that are part of, or in communication with, a computing device. The spoken utterance can be, for example, "Tell Matthew I'm on my way." The spoken utterance can be provided at the computing device when the computing device is not executing an application in the foreground, a computing device is executing an application in the foreground, or the computing device is executing one or more applications in the foreground and one or more applications in the background. The foreground and the background can refer to a graphical user interface being rendered at a display panel of the computing device. The foreground of the graphical user interface can be an area that is "on top of" the background of the graphical user interface, and therefore is most visible to a user that is viewing the graphical user interface, at least relative to a background area.

When a spoken utterance is detected at the operation 402, the method 400 can proceed from the operation 402 to the operation 404. Alternatively, when a spoken utterance is not detected at the operation 402, the computing device can continue to monitor for a spoken utterance or other input from one or more users. The operation 404 can include identifying an application that the spoken utterance is directed to. In some implementations, determining an application that the spoken utterance is directed to can be based on natural language content of the spoken utterance. For example, the content of the spoken utterance can be compared to application data for one or more different applications, and a correlation between the content and the application data can be determined. A particular application that most correlates to the content of the spoken utterance can be identified as an intended target for the spoken utterance.

The method 400 can further include an operation 406 of generating an action request based on the spoken utterance. In some implementations, the one or more actions can be identified based on the particular application that was determined to be the target of the spoken utterance. For example, the computing device can determine that a messaging application is the target of the spoken utterance, "Tell Matt I+m on my way," and, therefore, one or more actions capable of being performed by the messaging application can be identified. An identified action can include, for instance, a send message action, which can include one or more slot values such as, but not limited to, a contact name and message content (e.g., Send_Message{Contact_Name(Name); Message_Content(Text); . . . }). Therefore, because the send message action includes a slot value for a name, and the spoken utterance is synonymous with sending a message, the send message action can be determined as the target action for the spoken utterance. In some implementations, in order to generate the action request, the natural language content of the spoken utterance can be processed to identify one or more values for each slot value of the selected action. For example, the name "Matthew" can be assigned to the "Contact_Name" slot value, and the text "I'm on my way" can be assigned to the "Message_Content" slot value.

The method 400 can further include an operation 408 of generating a confidence metric based on the action request and/or the spoken utterance. The confidence metric can indicate a degree of correlation between the spoken utterance and content of the action request. Alternatively, or additionally, the confidence metric can be used to predict whether an action will be modified or confirmed by the user prior to the action request being transmitted to the identified application. For example, the degree of correlation between the spoken utterance and the content of the action request can be dependent on accuracy of a speech-to-text process and/or a natural language understanding process. Therefore, when the degree of correlation is low, the confidence metric can also be low or otherwise indicate that there is a lack of accuracy of the speech-to-text process and/or the natural language understanding process. However, when the degree of correlation is high, the confidence metric can also be high or otherwise indicate that the speech-to-text process and/or the natural language understanding process is at least sufficiently accurate. In some implementations, the confidence metric can be based on a total number of words provided in the spoken utterance, a frequency of use of particular words within the spoken utterance, an action that the spoken utterance is directed to, the application that the spoken utterance is directed to, and/or any other information from which a application metric can be based.

The method 400 can further include an operation 410 of determining whether the confidence metric predicts or otherwise indicates further confirmation and/or modification for the action. In other words, when the confidence metric is particularly low, the confidence metric can indicate that the user is likely to confirm or modify the action prior to the automated assistant initializing the action. Alternatively, when the confidence metric is relatively high, the confidence metric can indicate that the user is likely to not confirm or modify the action prior to the automated assistant initializing the action. When the confidence metric indicates that the user is not likely to confirm or modify the action prior to the automated assistant initializing the action, the method 400 can proceed to the operation 420. The operation 420 can include initializing performance of the action according to, or in response to, the spoken utterance. However, when the confidence metric indicates that the user is likely to confirm or modify the action prior to the automated assistant initializing the action, the method 400 can proceed to the operation 412.

The operation 412 can include determining a duration for a delay before initializing the action and/or transmitting the action request to the identified application. In some implementations, the duration for the delay can be based on the confidence metric. Alternatively, or additionally, the duration for the delay can be based on the confidence metric and/or one or more other metrics. For example, in some implementations, the duration for the delay can be dynamically adjusted according to information characterizing a context in which the user provided the spoken utterance. For instance, the information can characterize a location of the user, an application that is in a foreground of the graphical user interface, an application that is in a background of the graphical user interface, a notification that was most recently provided to the user via the computing device or another computing device, a frequency of performance of the action, a frequency of use of the identified application, a frequency of use of content of the spoken utterance, and/or any other information that can be related to a request for an application to perform an action.

In some implementations, the method 400 can include an operation 414 of causing an action impending notification to be rendered at a display interface. The action impending notification can indicate to the user that an action will be performed upon expiration of a delay period. In some implementations, the action impending notification can be rendered when the confidence metric indicates that the action request will be confirmed or modified before initialization of the action. The action impending notification can include a dynamic graphical element that characterizes, in real-time, expiration of the duration for the delay. During the duration of the delay, the user can elect to confirm and/or modify an action request before the action request is transmitted from the automated assistant to the identified application. Furthermore, in some implementations, the action impending notification can characterize content provided by the user via the spoken utterance. In this way, the user is able to view the content to be used for the action prior to the initialization of the action. This review of the content, however, is presumed to not be necessary when the confidence metric satisfies a threshold for bypassing delaying the action. Otherwise, when the confidence metric does not satisfy the threshold for bypassing delaying the action, a delay timer can be invoked and/or the action impending notification can be rendered at the display interface in order to delay the action for a duration of time. Furthermore, the duration of time can be based on the confidence metric, and/or any other information that can be associated with the automated assistant.

The method 400 can further include an operation 416 of initializing a real-time timer for indicating the expiration of the duration of the delay. The real-time timer characterizing the expiration of the duration for the delay can be initialized regardless of whether the action impending notification is rendered at the display interface. In this way, despite the action impending notification not being rendered in some implementations, the user can still have an opportunity to confirm or modify the action request prior to initialization of the action. However, when the action impending notification is rendered at the display interface, the real-time timer can be represented as a graphical element that changes over time to indicate the expiration of the delay duration.

The method 400 can further include an operation 418 of determining whether there was a modification of the action during the duration of the delay. When no modification is determined to be requested by the user during the duration of the delay, the method 400 can proceed to the operation 420 for initializing the action. However, when there is an indication that the user requested a modification to the action or the action request during the duration of the delay, the method 400 can return to the operation 408. At the operation 408, another confidence metric can be generated based on the modified action and/or the modified action request. Alternatively, in some implementations, when there is an indication that the user requested a modification to the action or the action request during the duration of the delay, the method 400 can proceed to the operation 420 for sending the modified action request to the identified application, and/or initializing performance of the modified action via the automated assistant.

Figure 5:
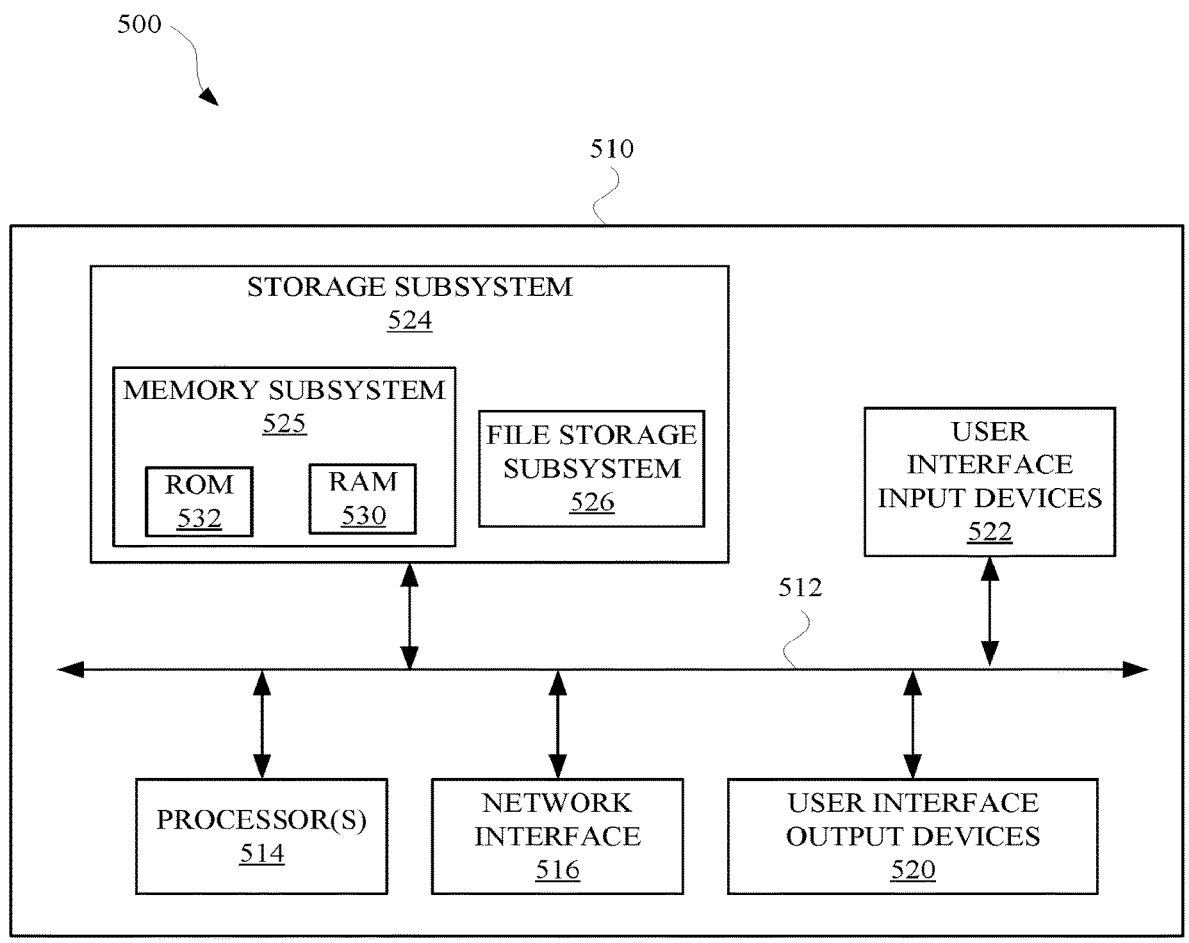
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules and/or engines described herein. For example, the storage subsystem 524 may include the logic to perform selected aspects of method 400, and/or to implement one or more of computing device 104, computing device 208, computing device 302, automated assistant 304 a server device, an action engine, a confidence metric engine, a delay duration engine, and/or any other application, device, apparatus, and/or engine discussed herein.

These software modules and/or engines are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules and/or engines implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors as including operations such as determining, at a computing device, that a user provided a spoken utterance to an interface of the computing device, wherein the computing device provides access to an automated assistant via the interface. The method can further can further include determining, based on the user providing the spoken utterance, that the spoken utterance is directed to an application that is accessible separate from the automated assistant. The method can further include generating, based on natural language content of the spoken utterance: an action request directed at the application, and a confidence metric for predicting whether the action request will be confirmed or modified before the action request is provided to the application. The method can further include determining, based on the confidence metric, whether an action-impending notification should be rendered in a foreground of a graphical user interface, wherein the action-impending notification characterizes content of the action request. The method can further include, when the confidence metric indicates that the action-impending notification should be rendered, the method further comprises: causing the action-impending notification to be rendered in the foreground of the graphical user interface. The method can further include, when the confidence metric indicates that the action-impending notification should not be rendered, the method further comprises: bypassing causing the action-impending notification to be rendered in the foreground of the graphical user interface, and causing the action request to be provided to the application via the automated assistant.

In some implementations, the action-impending notification includes an animated graphical element that characterizes a real-time expiration of a delay for the action request to be provided to the application via the automated assistant. In some implementations, a duration of the delay for the action request to be provided to the application via the automated assistant is based on the confidence metric. In some implementations, causing the action-impending notification to be rendered in the foreground of the graphical user interface includes: causing the action-impending notification to be rendered in the foreground for the duration of the delay or until the user acts to confirm and/or modify the action request. In some implementations, generating the confidence metric includes: processing input data that characterizes one or more features of a historical interaction between the user and the automated assistant. In some implementations, the method can further include, when the confidence metric indicates that the action-impending notification should be rendered, the method further comprises: determining that the user confirmed the action-impending notification rendered in the foreground of the graphical user interface within a duration of time, and causing, in response to determining that the user confirmed the action-impending notification, the action request to be provided to the application via the automated assistant.

In some implementations, the method can further include, when the confidence metric indicates that the action-impending notification should be rendered: determining that the user did not confirm the action-impending notification rendered in the foreground of the graphical user interface within a duration of time; and causing, in response to determining that the user did not confirm the action-impending notification, a trained machine learning model to be modified based on the user not confirming the action-impending notification. In some implementations, determining whether the spoken utterance is directed to the application includes: identifying the application as having provided a most recent notification, wherein the most recent notification corresponds to an incoming message from a sender.

In some implementations, generating the confidence metric includes identifying the sender of the incoming message, and wherein a value of the confidence metric is generated based on the sender. In some implementations, the action-impending notification includes other natural language content that is based on the spoken utterance and characterizes a draft message that is responsive to the incoming message. In some implementations, generating the confidence metric includes: determining a number of characters and/or words included in the draft message that is responsive to the incoming message, wherein a degree of confidence that the action request will be confirmed and/or modified is directly proportional to the number of characters and/or words that are included in the draft message. In some implementations, generating the confidence metric includes: determining a degree of correlation between textual content of the draft message and natural language content of the spoken utterance, wherein a higher degree of correspondence between the textual content of the draft message and the natural language content of the spoken utterance correlates to a higher confidence metric. In some implementations, when the confidence metric indicates that the action-impending notification should be rendered, the method further comprises: causing the action request to be provided to the application via the automated assistant after a delay if no confirmation or modification of the user request is received prior to the expiration of the delay.

In other implementations, a method implemented by one or more processors is set forth as including operations such as determining, at a computing device, that a user provided a spoken utterance to an interface of the computing device at which a first application and a second application are executing. In some implementations, the first application is being rendered in foreground of a graphical user interface that is accessible via a display panel of the computing device, and the computing device provides access to an automated assistant that is accessible separate from the first application and the second application. In some implementations, the method can further include determining, based on the user providing the spoken utterance and when the first application is rendered in the foreground of the graphical user interface, whether the spoken utterance is directed to the first application and/or the second application. In some implementations, the method can further include, when the spoken utterance is determined to be directed to the second application: generating, based on natural language content of the spoken utterance: an action request directed to the second application, and a confidence metric for predicting whether the action request will be confirmed and/or modified before the action request is provided to the second application. In some implementations, the method can further include determining, based on the confidence metric, whether to render an action-impending notification in the foreground of the graphical user interface, wherein the action-impending notification includes a graphical element that characterizes a duration of a delay before the action request is provided to the second application. In some implementations, when the confidence metric indicates that the action-impending notification should be rendered, the method further comprises: causing the action-impending notification to be rendered in the foreground of the graphical user interface. In some implementations, the method can further include, when the confidence metric indicates that the action-impending notification should be rendered, the method further comprises: bypassing causing the action-impending notification to be rendered in the foreground of the graphical user interface; and causing the action request to be provided to the second application via the automated assistant.

In some implementations, the duration of the delay before the action request is provided to the second application is based on the confidence metric, and causing the action-impending notification to be rendered in the foreground of the graphical user interface includes: causing the action-impending notification to be rendered in the foreground for the duration of the delay or until the user acts to confirm and/or modify the action request. In some implementations, generating the confidence metric includes: processing input data that characterizes one or more features of a historical interaction between the user and the automated assistant, the user and the first application, and/or the user and the second application. In some implementations, the method can further include, when the confidence metric indicates that the action-impending notification should be rendered: determining that the user confirmed the action-impending notification rendered in the foreground of the graphical user interface within the duration; and causing, in response to determining that the user confirmed the action-impending notification, the action request to be provided to the second application via the automated assistant. In some implementations, the method can further include, when the confidence metric indicates that the action-impending notification should be rendered: determining that the user did not confirm the action-impending notification rendered in the foreground of the graphical user interface within the duration. In some implementations, the method can further include: causing, in response to determining that the user did not confirm the action-impending notification, a trained machine learning model to be modified based on the user not confirming the action-impending notification, wherein the trained machine learning model is used in generating the confidence metric.

In some implementations, determining whether the spoken utterance is directed to the first application and/or the second application includes: identifying a particular application that provided a most recent notification, wherein the most recent notification corresponds to an incoming message from a sender, and wherein the second application is the particular application. In some implementations, generating the confidence metric includes identifying the sender of the incoming message, and wherein the duration of the delay before the action request is provided to the second application is based on the sender. In some implementations, the action-impending notification includes natural language content that is based on the spoken utterance and characterizes a draft message that is responsive to the incoming message. In some implementations, generating the confidence metric includes: determining a number of characters and/or words included in the draft message that is responsive to the incoming message, wherein the duration of the delay before the action request is provided to the second application is based on the number of characters and/or words included in the draft message.

In some implementations, generating the confidence metric includes: determining a degree of correlation between textual content of the draft message and natural language content of the spoken utterance, wherein a higher degree of correspondence between the textual content of the draft message and the natural language content of the spoken utterance correlates to shorter duration of the delay before the action request is provided to the second application. In some implementations, the graphical element characterizes, in real-time, an expiration of the duration in which the action-impending notification will be rendered at the display panel. In some implementations, the method can further include, when the confidence metric indicates that the action-impending notification should be rendered, the method further comprises: causing the action request to be provided to the application via the automated assistant after a delay if no confirmation or modification of the user request is received prior to the expiration of the delay.

In yet other implementations, a method implemented by one or more processors is set forth as including operations such as determining, at a computing device, that a user provided a spoken utterance to an automated assistant, wherein the computing device provides access to the automated assistant via one or more automated assistant interfaces. The method can further include identifying, based on determining that the user provided the spoken utterance, an action to perform in response to the spoken utterance provided by the user. The method can further include determining, based on the spoken utterance provided by the user and/or the action to perform in response to the spoken utterance, a duration for a delay before initializing the action via an action request provided by the automated assistant. The method can further include monitoring, during a real-time expiration of the duration of the delay, for another input from the user for confirming or modifying the action request before the action is initialized via the automated assistant. The method can further include, when, based on the monitoring, the user is determined to have provided the other input for confirming or modifying the action request during the duration of the delay: causing, in response to the user providing the other input during the duration of the delay, the automated assistant to at least temporarily bypass initializing the action. The method can further include, when, based on the monitoring, the user is determined to have not provided the other input for confirming or modifying the action request during the duration for the delay: causing, in response to determining that the user did not provide the other input during the duration of the delay, the automated assistant to initialize performance of the action.

In some implementations, the method can further include accessing, based on the user providing the spoken utterance, contextual data characterizing one or more properties of a context in which the user provided the spoken utterance, wherein determining the duration for the delay is based on the contextual data. In some implementations, the method can further include determining, based on the user providing the spoken utterance, whether to cause an action-impending notification to be rendered via a display panel of the computing device for the duration of the delay, wherein the action-impending notification characterizes a real-time expiration of the duration of the delay. In some implementations, determining the duration for the delay before initializing the action via the automated assistant includes processing audio data, which characterizes the spoken utterance, using a trained machine learning model.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   determining that a user provided a spoken utterance to an interface of a computing device, wherein the computing device provides access to an automated assistant via the interface;
   determining, based on processing the spoken utterance, that the spoken utterance is directed to an action for an application to perform, wherein the application is separate from the automated assistant;

determining, based on the spoken utterance, a duration of a delay before initializing the action via an action request provided by the automated assistant;

causing an action impending notification to be rendered, in a foreground of a graphical user interface for the duration of the delay, wherein the action-impending notification comprises:
  a characterization of content of the action request, and
  a dynamic graphical representation of a remaining duration of the duration of the delay;

monitoring, during the duration of the delay, for confirmation input from the user for confirming the action or modification input from the user for modifying the action;

when, based on the monitoring, the user is determined to have provided the modification input for modifying the action during the duration of the delay:
  causing the automated assistant to at least temporarily bypass initializing the action; and when, based on the monitoring, the user is determined to have provided the confirmation input for confirming the action request during the duration of the delay or is determined to have allowed the duration of the delay to expire without providing either the confirmation input or the modification input:
  causing the automated assistant to initialize performance of the action by providing the action request.

2. The method of claim 1, further comprising:
accessing contextual data characterizing one or more properties of a context in which the user provided the spoken utterance, wherein determining the duration of the delay is further based on the contextual data.

3. The method of claim 1, wherein determining, based on the spoken utterance, the duration of the delay comprises:
  generating, based on natural language content of the spoken utterance, a confidence metric; and
  determining the duration of the delay based on the confidence metric.

4. The method of claim 3, wherein generating the confidence metric is further based on input data that characterizes one or more features of a historical interaction between the user and the automated assistant.

5. The method of claim 1, wherein determining the spoken utterance is directed to the action for the application to perform further comprises:
  determining the application based on the application having provided a most recent notification, wherein the most recent notification corresponds to an incoming message from a sender.

6. The method of claim 5, wherein determining the duration of the delay is further based on a sender of the incoming message.

7. The method of claim 1, wherein determining, based on the spoken utterance, the duration of the delay comprises:
  determining the duration of the delay based on a quantity of words in the spoken utterance and/or a quantity of characters in the words.

8. The method of claim 1, wherein the action includes sending a message, wherein natural language content of the spoken utterance includes words to include in the message, and wherein determining, based on the spoken utterance, the duration of the delay comprises:
  determining the duration of the delay based on a quantity of characters in the words and/or a quantity of the words.

9. The method of claim 1, wherein determining, based on the spoken utterance, the duration of the delay comprises:
  determining one or more confidence metrics based on speech to text conversion of the spoken utterance; and
  determining the duration of the delay is based on the one or more confidence metrics.

10. The method of claim 1, wherein determining, based on the spoken utterance, the duration of the delay comprises:
  determining, based on historical user data, a level of similarity between the action and previous user actions; and
  determining the duration of the delay based on the level of similarity.

11. A method implemented by one or more processors, the method comprising:
  determining that a user provided a spoken utterance to an interface of a computing device, wherein the computing device provides access to an automated assistant via the interface;
  determining, based on processing the spoken utterance, that the spoken utterance is directed to an action for an application to perform, wherein the application is separate from the automated assistant;
  determining, based on the spoken utterance, to render an action impending notification in the foreground of a graphical user interface for a duration of a delay before initializing the action via an action request provided by the automated assistant, wherein the action-impending notification comprises:
    a characterization of content of the action request, and
    a dynamic graphical representation of a remaining duration of the duration of the delay;
  monitoring, during the duration of the delay, for confirmation input from the user for confirming the action or modification input from the user for modifying the action;
  when, based on the monitoring, the user is determined to have provided the modification input for modifying the action during the duration of the delay:
    causing the automated assistant to at least temporarily bypass initializing the action; and
  when, based on the monitoring, the user is determined to have provided the confirmation input for confirming the action request during the duration of the delay or is determined to have allowed the duration of the delay to expire without providing either the confirmation input or the modification input:
    causing the automated assistant to initialize performance of the action by providing the action request.

12. The method of claim 11, wherein the action comprises sending a message to an additional user of an additional computing device.

13. The method of claim 12, further comprising:
  determining, based on the spoken utterance, the duration of the delay.

14. The method of claim 13, wherein the message is determined based on the spoken utterance and wherein determining the duration of the delay based on the spoken utterance comprises:
  determining the duration of the delay based on a length of the message.

15. A method implemented by one or more processors, the method comprising:
  determining that a user provided a spoken utterance to an interface of a computing device, wherein the computing device provides access to an automated assistant via the interface;
  determining, based on processing the spoken utterance, that the spoken utterance is directed to an action for an application to perform, wherein the application is separate from the automated assistant;

determining, based on the action, a duration of a delay before initializing the action via an action request provided by the automated assistant;

causing an action impending notification to be rendered, in a foreground of a graphical user interface for the duration of the delay, wherein the action-impending notification comprises:
   a characterization of content of the action request, and
   a dynamic graphical representation of a remaining duration of the duration of the delay;

monitoring, during the duration of the delay, for confirmation input from the user for confirming the action or modification input from the user for modifying the action;

when, based on the monitoring, the user is determined to have provided the modification input for modifying the action during the duration of the delay:
   causing the automated assistant to at least temporarily bypass initializing the action; and when, based on the monitoring, the user is determined to have provided the confirmation input for confirming the action request during the duration of the delay or is determined to have allowed the duration of the delay to expire without providing either the confirmation input or the modification input:
   causing the automated assistant to initialize performance of the action by providing the action request.

16. The method of claim 15, herein determining, based on the action, the duration of the delay comprises:
   determining, based on historical user data, a level of similarity between the action and previous user actions; and
   determining the duration of the delay based on the level of similarity.

17. The method of claim 15, wherein the action includes sending a message, and wherein determining, based on the spoken utterance, the duration of the delay comprises:
   determining the duration of the delay based on a quantity of characters in the message and/or a quantity of the words in the message.

* * * * *